(12) United States Patent
Hoffman et al.

(10) Patent No.: US 6,223,768 B1
(45) Date of Patent: May 1, 2001

(54) DUST COVER

(75) Inventors: Richard E. Hoffman, Overland Park, KS (US); David M. Garner, Cumming, GA (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 09/595,116

(22) Filed: Jun. 16, 2000

(51) Int. Cl.[7] ....................................... E03B 1/00
(52) U.S. Cl. .................. 137/381; 137/360; 137/377; 137/380; 251/339; 251/354
(58) Field of Search ..................... 137/360, 377, 137/387, 380; 251/354, 339

(56) References Cited

U.S. PATENT DOCUMENTS

| | | |
|---|---|---|
| 3,695,288 * | 10/1972 | Billeter et al. .................. 137/360 |
| 4,324,318 | 4/1982 | Karasudani . |
| 4,974,636 * | 12/1990 | Cogger ............................ 137/625.17 |
| 5,062,453 * | 11/1991 | Saadi et al. ..................... 137/624.11 |
| 5,236,005 | 8/1993 | Berg . |
| 5,263,502 * | 11/1993 | Dick ..................................... 137/360 |
| 5,549,487 * | 8/1996 | Nortier ................................. 439/521 |
| 5,562,121 | 10/1996 | Hodges et al. . |

\* cited by examiner

*Primary Examiner*—A. Michael Chambers
*Assistant Examiner*—Thomas L. McShane
(74) *Attorney, Agent, or Firm*—Barnes & Thornburg

(57) ABSTRACT

An outlet dust cover, for attachment to a back plate having a wall plate formed to include an aperture within which a valve controlling gas flow in a pipe is received, includes a plate, a valve actuator located in the plate and arranged to be positioned adjacent the valve when the plate is positioned adjacent the wall plate, the valve actuator having a first state in which the valve is not actuated and a second state wherein the valve is actuated, and a vent extending through the cover and positioned to be in communication with the pipe.

15 Claims, 5 Drawing Sheets

DUST COVER

This application is a claims benefit of Provisional application 60/139,967 filed on Jun. 19, 1999.

BACKGROUND AND SUMMARY OF THE INVENTION

The present invention relates to a dust cover. More particularly, the present invention relates to a dust cover for gas outlet back plates.

Dust covers are useful devices for covering exposed gas back plates during construction. A hospital or laboratory often distributes gas, like oxygen, from a centrally located source through pipes into various operating rooms or lab spaces. During construction of these hospitals and laboratories, the pipes are connected, brazed together, and fitted inside the walls. A back plate is connected to the exposed end of the pipe. A permanent outlet used to selectively dispense the gas is attached to the back plate during the final stages of construction. As an interim step before the outlet is attached, a dust cover is attached to the back plate. Conventional dust covers are placed over the back plate preventing dust, sheet rock, paint, etc., from depositing into the gas pipes during construction. Once the construction has neared completion the dust cover is removed and the outlet is attached.

When the pipes, usually made of copper, are brazed together it is often useful to fill them with an inert gas, typically nitrogen. This gas helps prevent scale from forming on the pipes. It is also useful to periodically purge a portion of that gas to create a flow further enhancing the scale resistance. In addition, builders often need to test the pipes for pressurization. Many back plates include a check valve fitted in the pipe that allows the gas pressure to be checked. Currently, in order to engage this check valve the dust cover has to be removed. Removal of the dust cover, however, increases the risk of contamination to the pipes. It would be useful for a dust cover to have a means for which the gas pressure in the pipe may be tested without having to remove the cover.

According to certain features, characteristics, embodiments and alternatives of the present invention which will become apparent as the description thereof proceeds below, the present invention provides an outlet dust cover to a back plate having a wall plate formed to include an aperture within which a valve controlling gas flow in a pipe is received. The dust cover comprises a plate, a valve actuator located in the plate and arranged to be positioned adjacent the valve when the plate is positioned adjacent the wall plate. The valve actuator assumes a first state in which the valve is not actuated and a second state wherein the valve is actuated. A vent extends through the cover and is positioned to be in communication with the pipe.

Additional features of the invention will become apparent to those skilled in the art upon consideration of the following detailed description exemplifying the best mode of carrying out the invention as presently perceived.

BRIEF DESCRIPTION OF THE DRAWINGS

The present invention will be described with reference to the attached drawings which are given as non-limiting examples only, in which.

Corresponding reference characters indicate corresponding parts throughout the figures. The exemplification set out herein illustrates preferred embodiments of the invention, and such exemplification is not to be construed as limiting the scope of the invention in any manner.

DETAILED DESCRIPTION OF THE DRAWINGS

Figure 1:
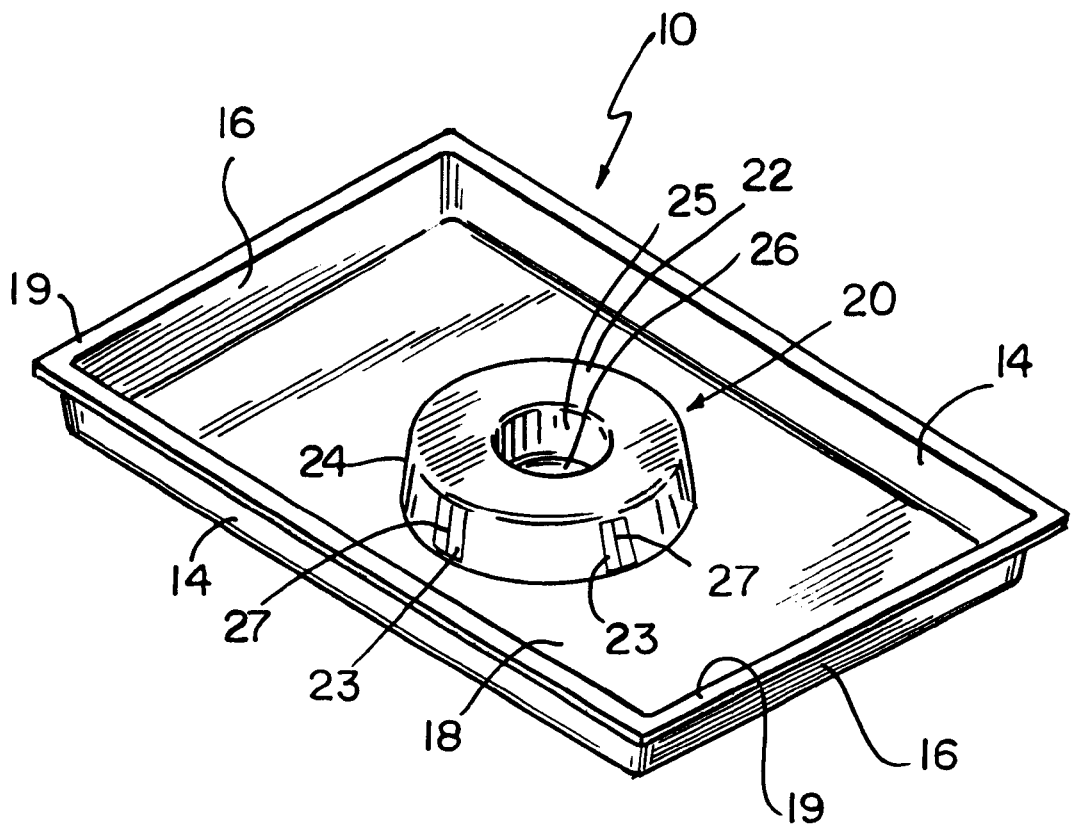
FIG. 1 is a perspective view of an outlet dust cover.
Figure 2:
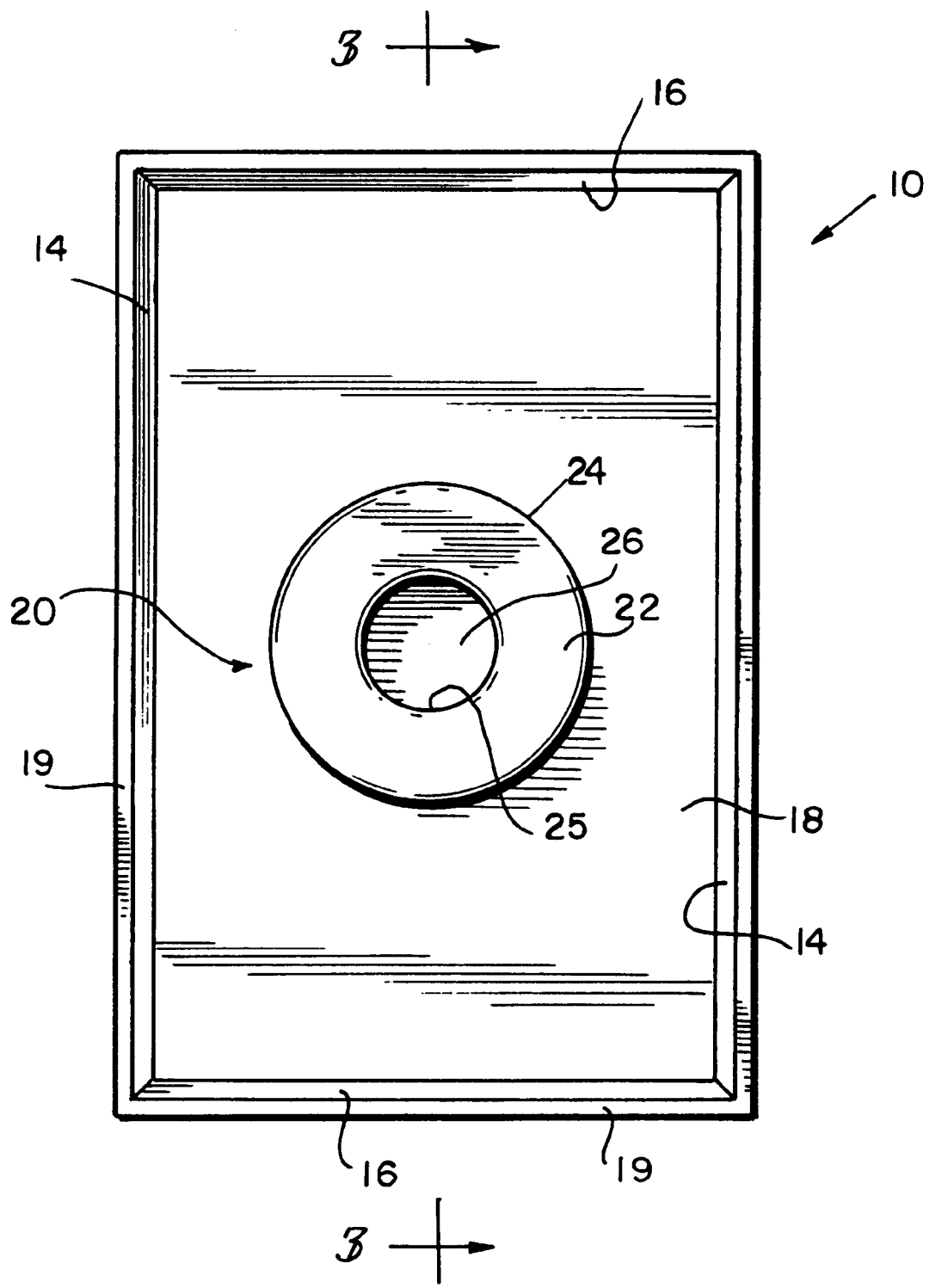
FIG. 2 is a plan view of the outlet dust cover from FIG. 1.
Figure 3:
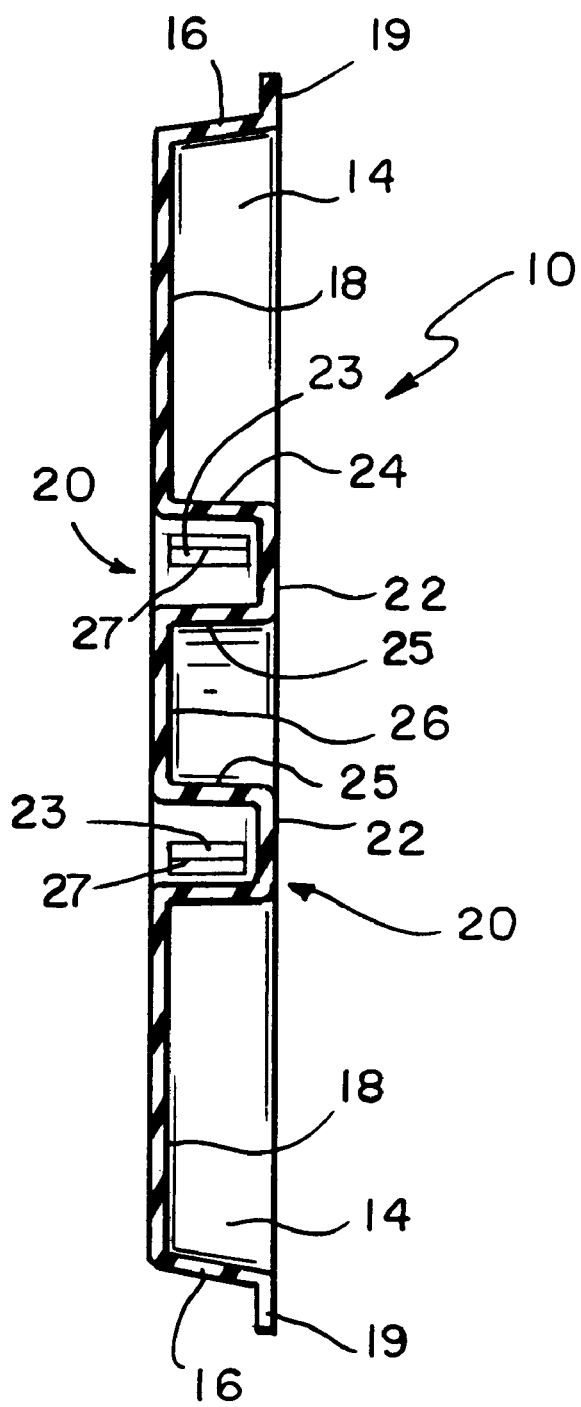
FIG. 3 is a sectional view along line 3—3 of the outlet dust cover from FIG. 2.

The present invention relates to a dust cover. More particularly, the present invention relates to a dust cover for placing over gas outlet back plates. The dust cover will be described herein with reference to FIGS. 1–5. While the described embodiments are considered by the inventor to be the best mode of carrying out the invention, it should be understood that the claims presented below are not limited to the particular details of the described embodiments. Numerous variations may be readily apparent to those of skill in the art which would provide for construction of the outlet dust cover which incorporates the principles of the present invention as claimed.

Outlet dust cover 10 is a temporary shield covering the ends of gas pipes 30 during the construction process. Outlet dust covers 10 protect the back plate 12 and pipes 30 from dust, paint, or other construction materials that may be harmful to patients or ruin experiments. Dust cover 10 is removed once construction is near completion and a permanent outlet is attached to the back plate 12.

It is appreciated that outlet dust cover 10 may be molded from a single piece of flexible material, or comprise several different components. Illustratively, dust cover 10 is molded from transparent blue polystyrene having a thickness of 0.009 inches (15 mil) (0.22 mm). In addition, the cover may be molded from plastic or any variety of suitable materials. For example, metal, foam, or combinations thereof may be suitable for either the entire dust cover or the components of the dust cover.

Outlet dust cover 10, according to one embodiment of the present invention, is shown in FIG. 1. Illustratively, dust cover 10 is rectangularly shaped and sized to cover a conventional back plate 12. (See FIGS. 4 and 5). Back plates 12 are typically formed with walls 32 extending transversely from the main or wall plate 34 to form a rectangular recess sized to receive a gas outlet (not shown). Dust cover 10 is sized to be received in the recess as shown, for example, in FIGS. 4 and 5. It is appreciated, however, that dust cover 10 may be made of any shape and size to fit any variety of back plates. In the illustrated embodiment, dust cover 10 comprises two parallel spaced side walls 14 and two end walls 16. Each end wall 16 extends between the two side walls 14. As shown, for example, in FIGS. 4 and 5, side walls 14 and end walls 16 extend transversely from plate 18 by a distance substantially equal to the depth of the recess formed by walls 32 of back plate 12. Illustratively, plate 18 recessively interconnects to the side and end walls 14 and 16 respectively. A lip 19 extends peripherally beyond side walls 14 and end walls 16 to cover ends of walls 32.

According to one embodiment of the present invention, a valve actuator or purge hub 20 is connected to plate 18.

Purge hub 20 illustratively comprises a ring 22, an outer rim 24, an inner wall 25, and a button 26. Outer rim 24 depends from the periphery of ring 22 and extends between ring 22 and plate 18. Inner wall 25 extends downwardly from inner edge of ring 22. Button 26 extends between bottom edge of inner wall 25. Purge means or button 26 is positioned in the center of ring 22. (See FIGS. 2 and 4.) Illustratively, outer rim 24 is formed to include thin wall sections 23 within which vent slots 27 are formed through which gas may be purged from a valve 28 being tested. In addition, instead of button 26, some other means like a knob, for example, that may be rotated to release gas through a cooperating vent. The means by which the gas is released through the cover 10 may be dictated by the type of back plate 12 and/or valve 28 that is used. Any variety of means to cover the back plate 12 and selectively purge gas from said back plate 12 is contemplated by the present invention.

Figure 4:
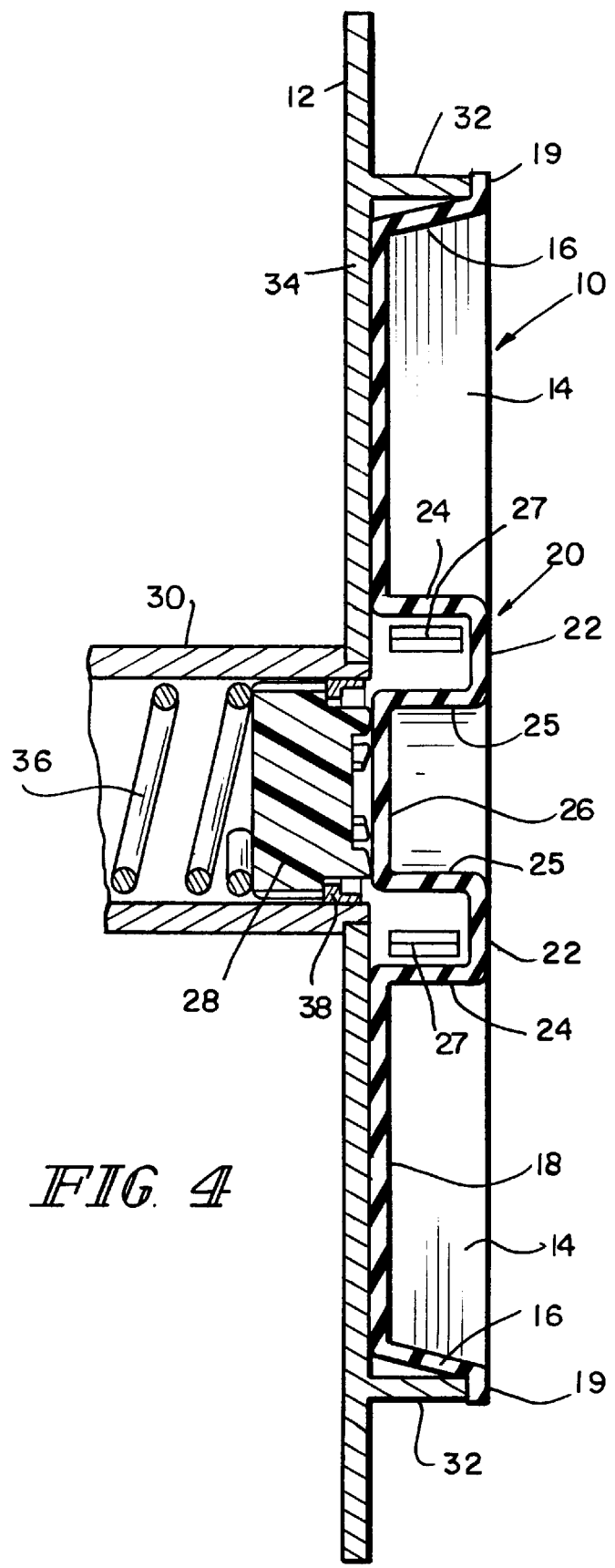
FIG. 4 is a sectional view similar to FIG. 3 with the outlet dust cover fitted over a back plate having a spring loaded check valve therein showing a purge hub of the dust cover adjacent the check valve.
Figure 5:
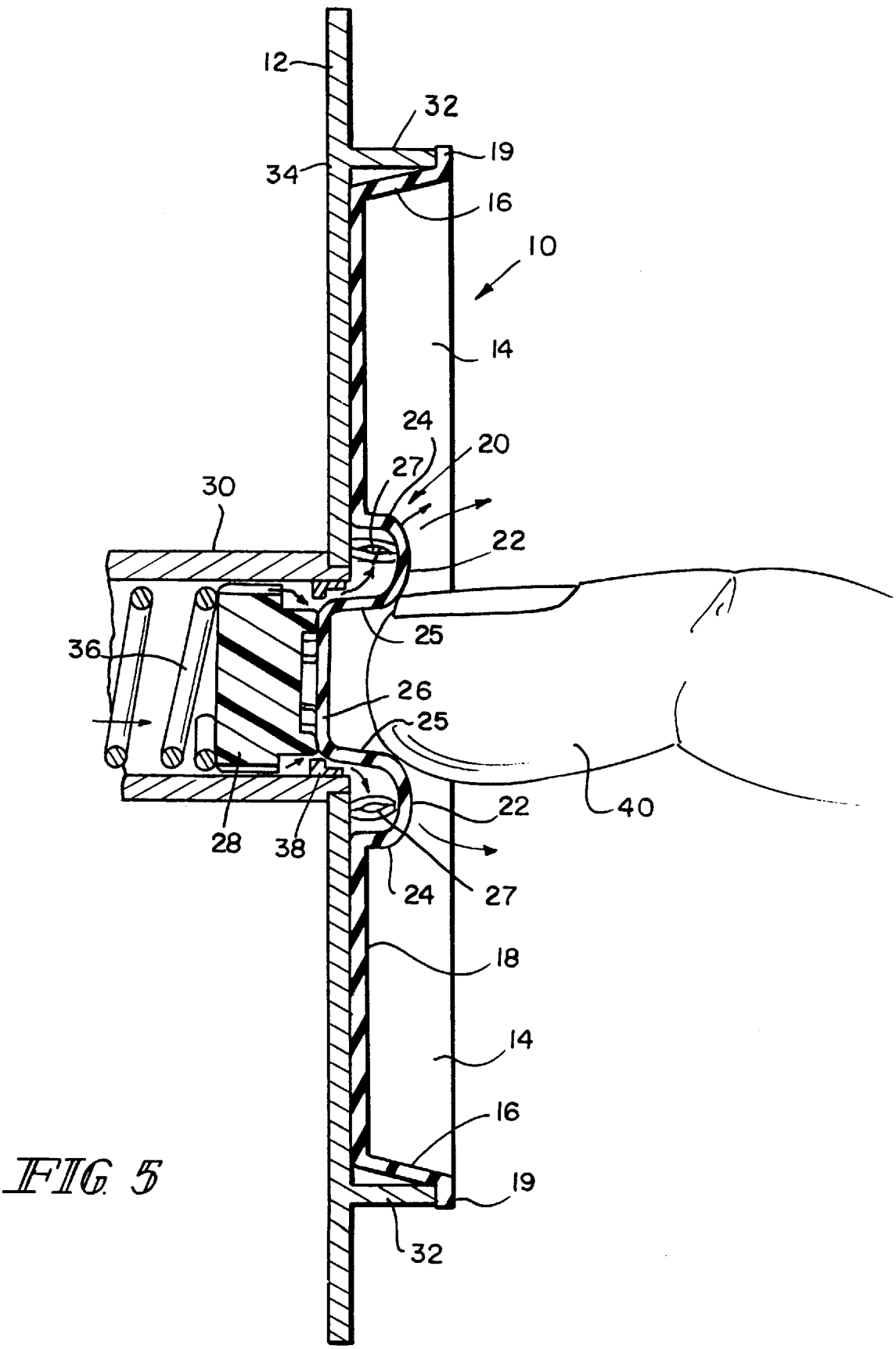
FIG. 5 is a view similar to FIG. 4 showing a finger of an operator depressing the purge hub to depress the spring in the back plate to permit gas to pass around the check valve and exit through vents in the purge hub.

Referring to FIGS. 4 and 5, operation of dust cover 10 in conjunction with back plate 12 is illustrated. Back plate 12 includes an aperture through which gas pipe 30 passes for connection to a gas coupling (not shown). A check valve body 28 is urged by spring 36 against retaining rings 38 in back plate 12 to normally seal gas pipe 30 from leakage, as shown, for example, in FIG. 4. Dust cover 10 is received in recess formed by walls 32 in back plate 12 so that plate 18 is adjacent the wall plate 34 of back plate 12. Button 26 is adjacent check valve body 28. Vent slots 27 are closed when hub 20 is in the first non-depressed state shown in FIG. 4 so that dust may not enter through vent slots 27. Thus dust cover 10 inhibits dust from entering back plate 12, pipe 30, and check valve 28 during construction or remodeling.

To test the connections of gas pipe 30, it is necessary to depress spring 36 so that gas can flow around check valve body 28 out of pipe 30. Since illustrated dust cover 10 is molded from flexible material, an operator may push with a finger 40 on purge hub 20 to induce hub 20 into a second state in which button 26 is urged against check valve body 28 thereby depressing spring 36 to allow gas to flow around check valve body from pipe 30. Deformation of hub 20 induces vent slots 27 in thin wall sections 23 to deform and open to allow gas to pass therethrough, as shown, for example, in FIG. 5, gas in pipe 30, passes through vent slots 27 in rim 24 of purge hub 20, as shown, for example, in FIG. 5. The gas rushing out of pipe 30 around valve 28 and through vent slots 27 (as shown by arrows in FIG. 5) inhibits dust from entering back plate 12 when hub 20 is in the second state. Thus, dust cover 10 permits back plate 12 to be tested and unwanted gasses purged from pipe 30 prior to attachment of gas coupling (not shown) to back plate 12.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as set forth in the following claims.

What is claimed is:

1. An outlet dust cover for attachment to a back plate having a wall plate formed to include an aperture within which a valve controlling gas flow in a pipe is received, the dust cover comprising:

a plate;

a valve actuator located in the plate and arranged to be positioned adjacent the valve when the plate is positioned adjacent the wall plate; the valve actuator having a first state in which the valve is not actuated and a second state wherein the valve is actuated; and a vent extending through the cover and positioned to be in communication with the pipe.

2. The outlet dust cover of claim 1 wherein the vent is open when the valve actuator is in the second state and closed when the valve actuator is in the first state.

3. The outlet dust cover of claim 1 wherein the valve actuator is formed from a flexible material and the vent comprises a slit formed in the valve actuator.

4. The outlet dust cover of claim 3 wherein the vent is open when the valve actuator is in the second state and closed when the valve actuator is in the first state.

5. The outlet dust cover of claim 4 wherein the valve actuator includes a hub extending from the plate, the hub including an outer rim, an inner wall having a base, a button extending between the base of the inner wall, and a ring extending between the inner wall and the outer rim.

6. The outlet dust cover of claim 5 wherein the button is positioned to be adjacent the valve when the plate is positioned adjacent the wall plate.

7. The outlet dust cover of claim 6 wherein the vent is formed through the outer rim.

8. The outlet dust cover of claim 1 wherein the valve actuator is a purge button that is depressed to open the vent.

9. The outlet dust cover of claim 8, wherein the purge button is connected to a rim extending from the plate.

10. The outlet dust cover of claim 9, wherein at least one vent is formed in the rim.

11. An outlet dust cover comprising:

a valve actuator;

a plate connected to the valve actuator;

at least one vent connectable to the valve actuator; and wherein engagement of the valve actuator causes the vent to open.

12. The outlet dust cover of claim 11, wherein the valve actuator is a purge button that is depressed to open the vent.

13. The outlet dust cover of claim 12, wherein the purge button is connected to a rim extending from the plate.

14. The outlet dust cover of claim 13, wherein at least one vent is formed in the rim.

15. The outlet dust cover of claim 14, wherein the purge button engages the rim as the button is depressed which causes the vent to open.

* * * * *